May 28, 1957  C. W. BERTHIEZ  2,793,570
DEVICE FOR TAKING UP THE PLAY OF A MACHINE MEMBER MOVABLE IN
SLIDEWAYS AND SUBJECT TO VARIABLE STRESSES
Filed July 27, 1953  8 Sheets-Sheet 1
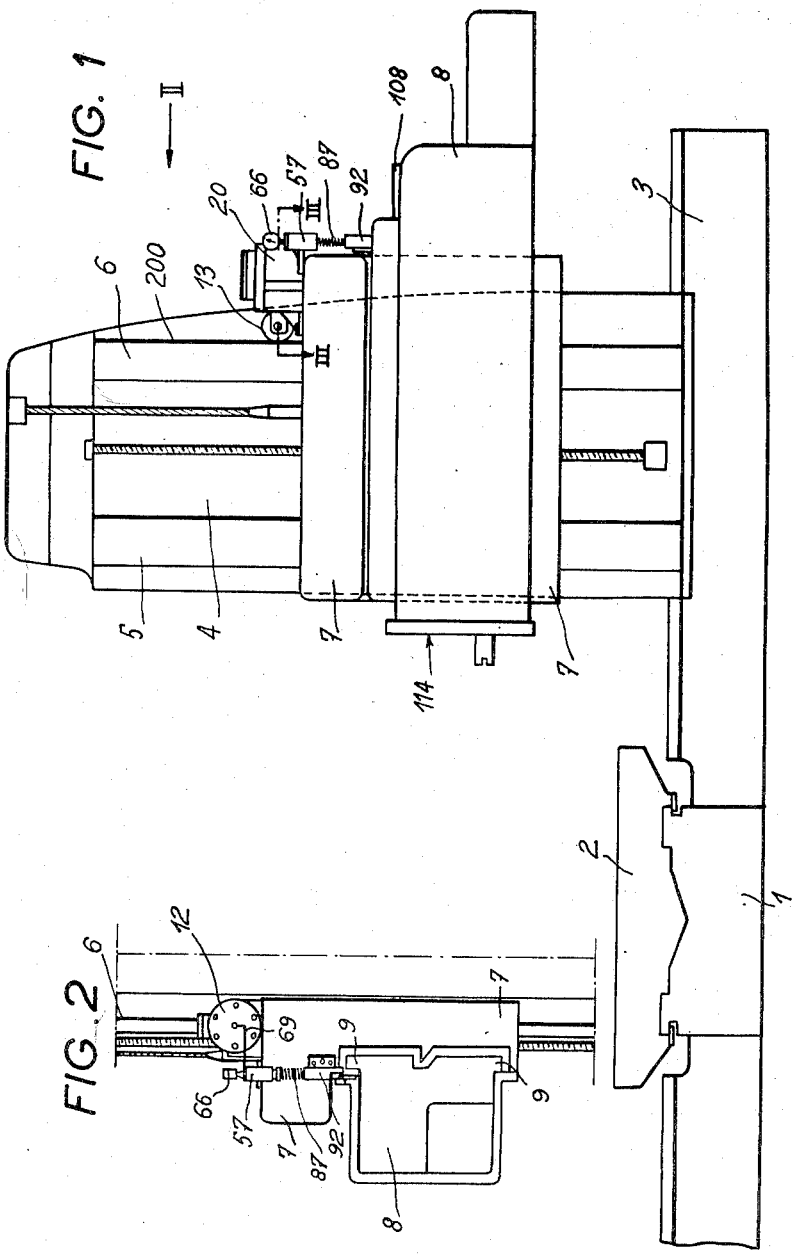
INVENTOR
Charles William Berthiez
By George N Corey
ATTORNEY

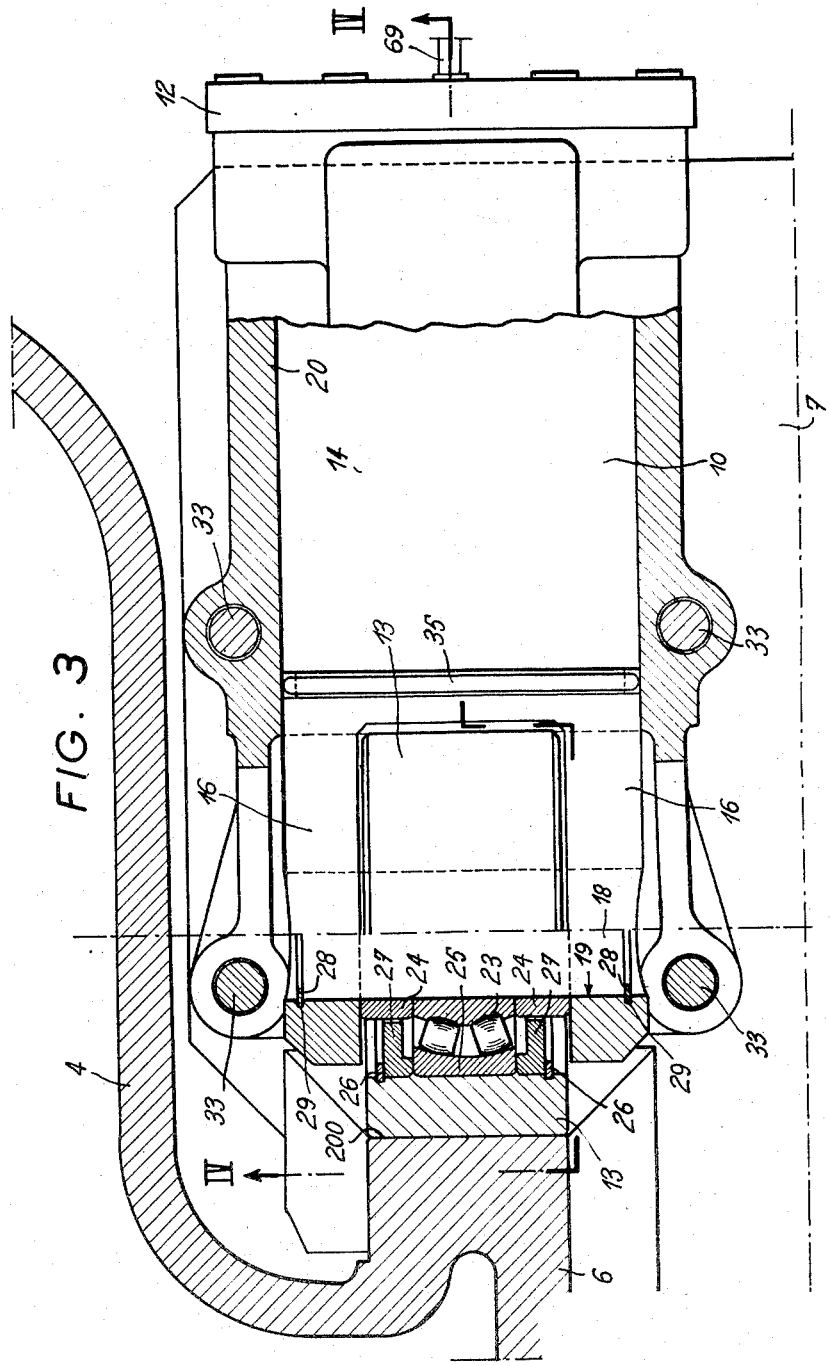

INVENTOR
Charles William Berthiez
By George H Corley
ATTORNEY

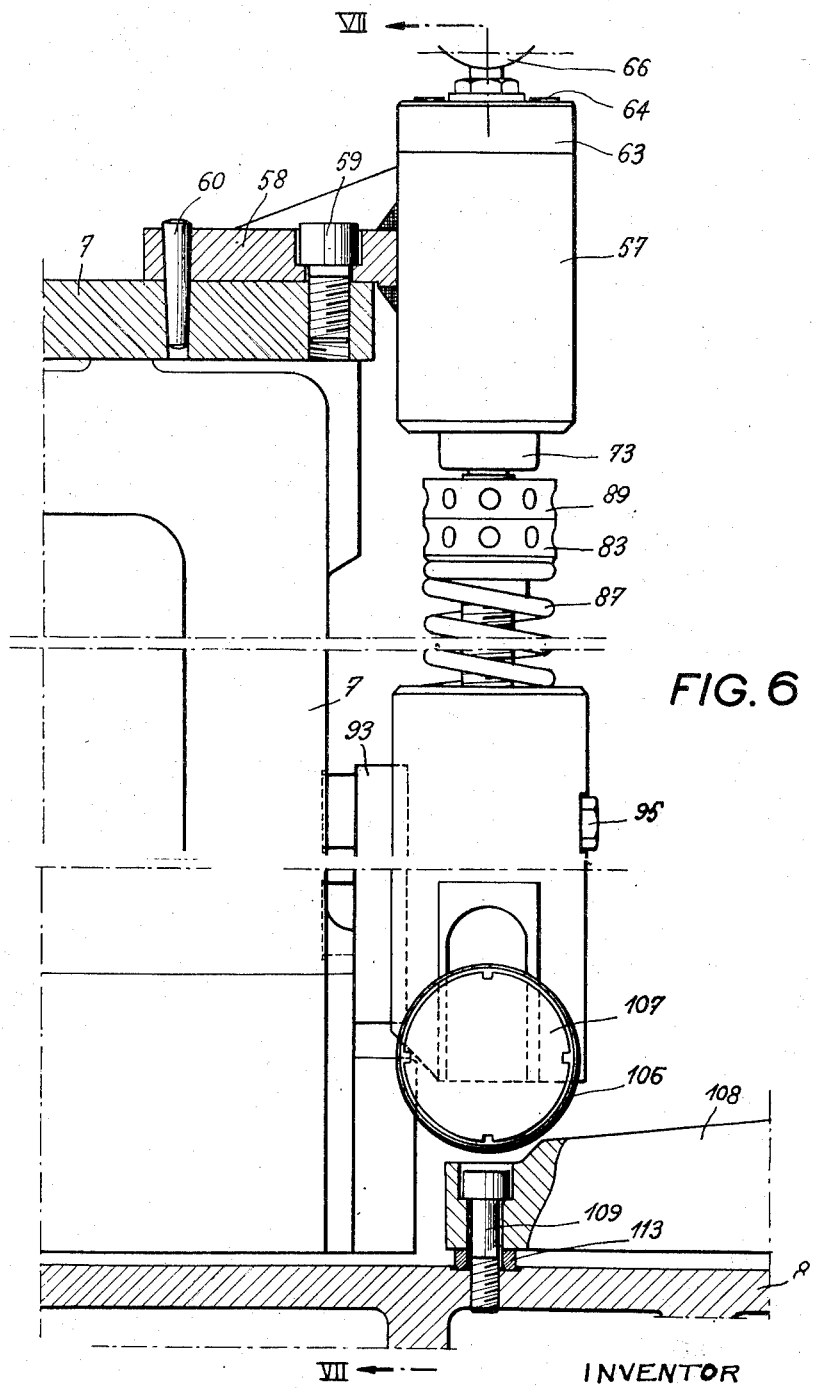

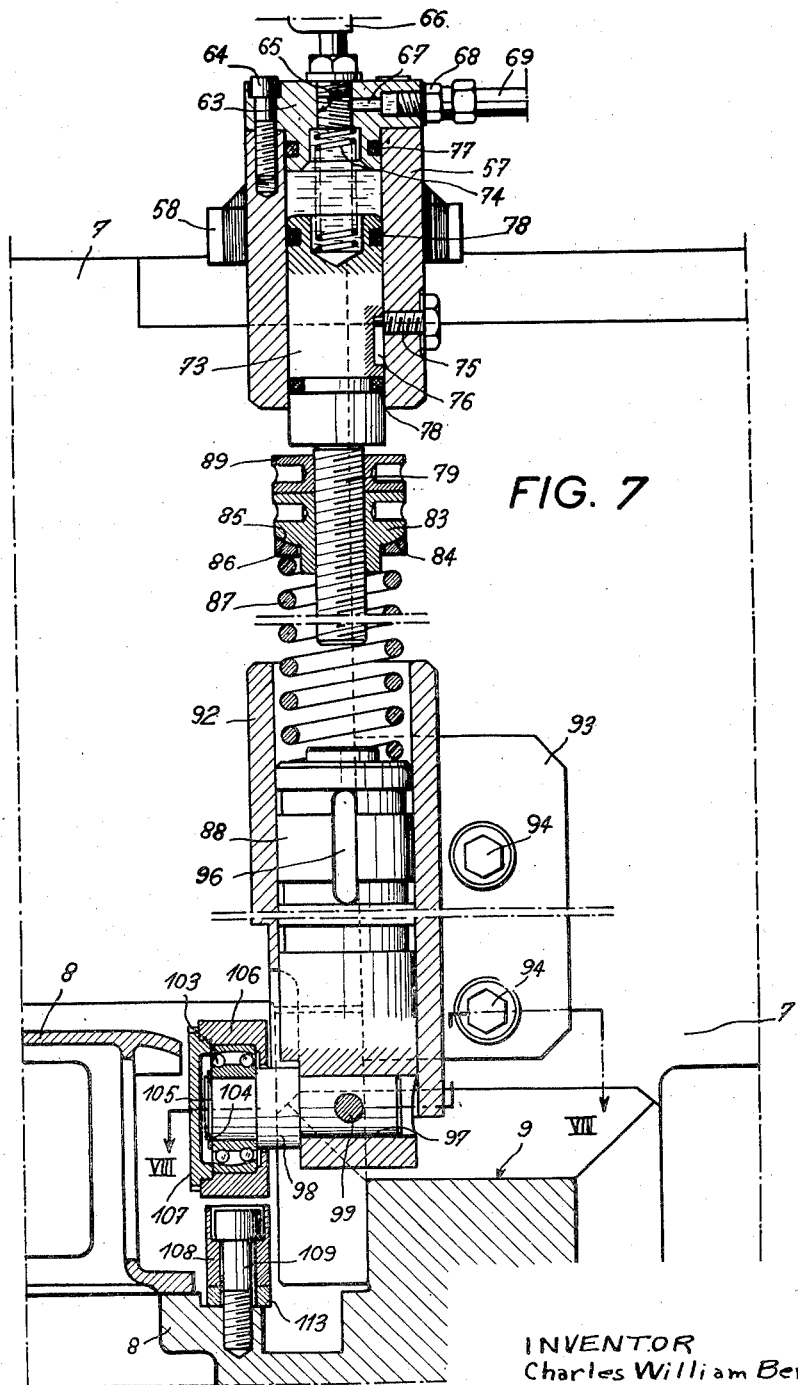

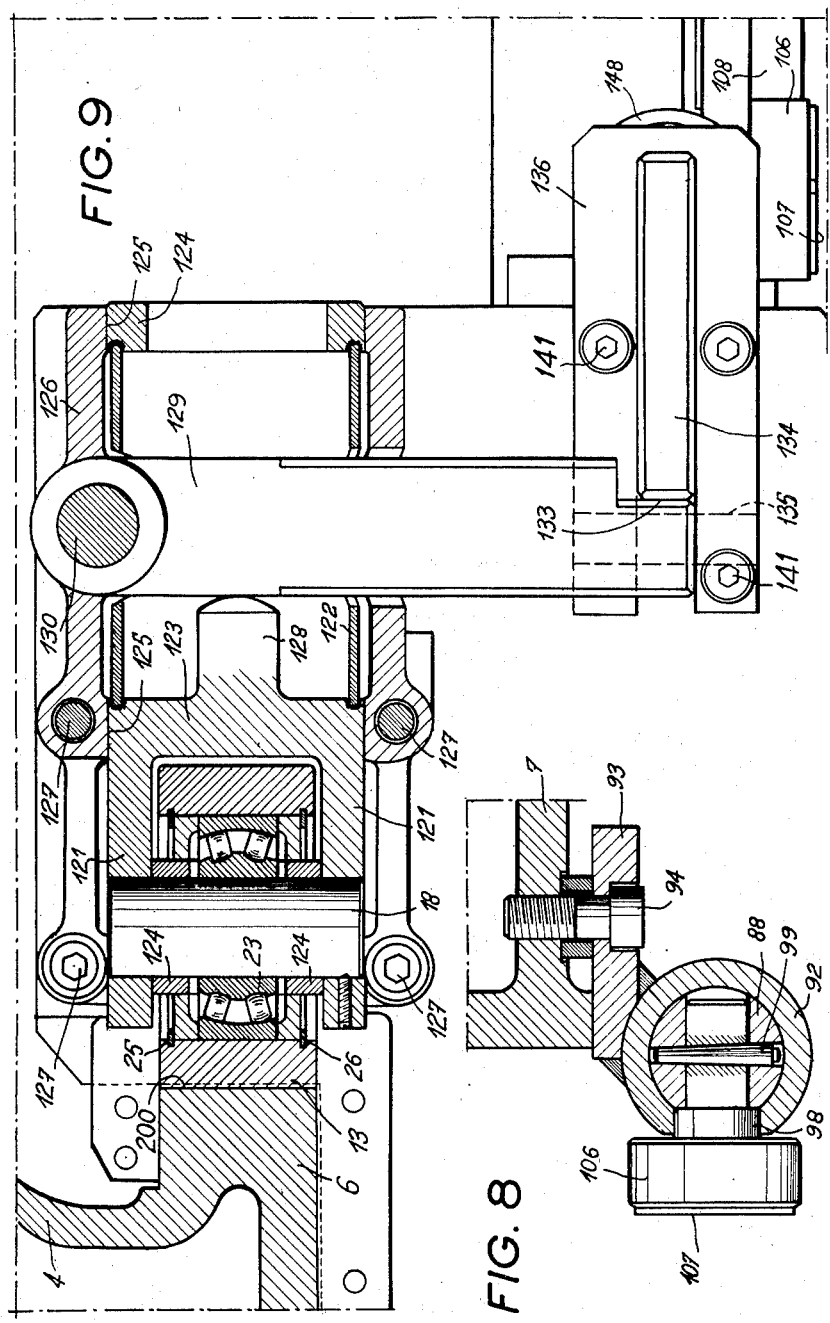

INVENTOR
Charles William Berthiez
By George H Corey
ATTORNEY

United States Patent Office 2,793,570
Patented May 28, 1957

2,793,570

DEVICE FOR TAKING UP THE PLAY OF A MACHINE MEMBER MOVABLE IN SLIDEWAYS AND SUBJECT TO VARIABLE STRESSES

Charles William Berthiez, Bizy-Vernon, France, assignor to Société Anonyme dite: Societe Nouvelle de Construction de Machines-Outils et d'Outillage Procedes C. W. B., Paris, Seine, France Application July 27, 1953, Serial No. 370,499

Claims priority, application France August 4, 1952

9 Claims. (Cl. 90—14)

It often happens that a machine member movable in slideways is subject to variable stresses. This may occur if these stresses applied to a fixed point of said member are of variable intensity, or if the point upon which these stresses are applied is variable on said member, or if the intensity of these stresses and their points of application on said member are both variable. The result is that the guiding conditions of such a machine member in its slideways are not strictly unvarying and a certain lack of precision ensues. This lack of precision is particularly detrimental in machine-tools for it prevents obtaining the high grade finish desired.

The invention precisely aims at maintaining the guiding conditions of the movable member in its slideways as constant as possible, whatever may be the conditions of application of the stresses exerted upon said member. The following description refers more particularly to the guiding of a machine member subjected to varying stresses because of its variable cantilever relation to its support along which it is movable horizontally.

According to the invention, a device is provided for taking up the play of a machine member movable in slideways and subjected to variable stresses originated by a part of said machine supported by said member for sliding movement of said part relative to said member, this device including a compensating roller carried by the movable member and urged by pressure regulating means against a rollway disposed parallel to the slideways. The means regulating the pressure of the compensating roller on its rollway are connected to said machine part, which exerts variable stresses upon said movable machine member, through a connection including resilient means yielding under the action of the movable part as it is shifted on said machine member.

The resilient means is preferably constituted by a spring the initial tension of which is adjustable.

In a preferred embodiment of the invention, the linking mechanism between the parts which adjust the pressure of the compensating roller on its rollway and the part movable on said machine member includes a control rollway which may be a cam carried by said movable part and a control roller carried by said movable member and cooperating with said cam, said control roller being connected to said resilient means.

Other features of the invention are brought forward in the following specification and the accompanying drawings given only by way of examples and in which:

Fig. 1 is a somewhat diagrammatic front elevational view of a milling and boring machine to which a first embodiment of a device according to the invention is applied.

Fig. 2 is a fragmentary side elevational view of the machine shown in Fig. 1 seen in the direction of the arrow II.

Fig. 3 is a sectional view along line III—III of Fig. 1 and on a larger scale.

Fig. 6 shows in elevation a detail of Fig. 1 on the same scale as Figs. 3 and 4.

Fig. 7 is a sectional view along line VII—VII of Fig. 6.

Fig. 8 is a horizontal sectional view along line VIII—VIII of Fig. 7.

Fig. 9 is a sectional view similar to Fig. 3 of a second embodiment of the invention.

Figure 4:
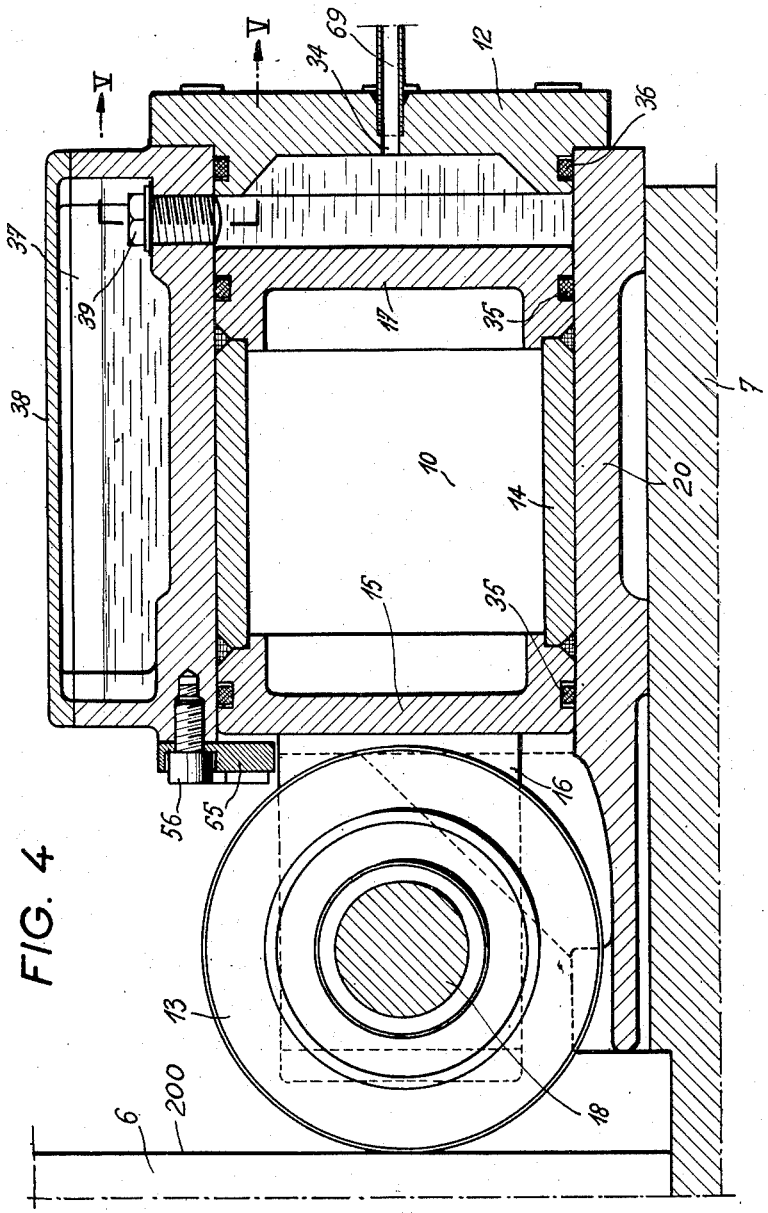
Fig. 4 is a sectional view along line IV—IV of Fig. 3.

Figs. 1 and 2 show diagrammatically the main members of a horizontal milling and boring machine, viz.: a bed 1 supporting a workpiece carrying table 2 and a second bed 3 perpendicular to the first bed and on which may slide an upright or column 4 provided with vertical slideways 5, 6 designed to support and to guide a saddle 7 carrying a machine part, the spindle-carriage 8. The spindle-carriage is horizontally movable on the saddle along slideways 9.

As the spindle-carriage 8 is being shifted horizontally on the saddle 7 towards the left-hand side (see drawing Fig. 1), its left-hand part overhangs more and more and so exerts upon the saddle 7 a variable reaction, so that the distribution of the pressure exerted upon the various points of the vertical slideways by the saddle 7 which are in sliding engagement with the vertical slideways 5, 6 of the column is modified. The oilfilm between these two sets of slideways is thus subject to pressures varying according to the length of the overhang of the spindle-carriage 8 with respect to the saddle 7, which results in a lack of machining precision. Even slight variations of the spindle-axis inclination are detrimental to the high grade precision striven for.

The invention has for its object to provide a device including a compensating roller 13 carried by the saddle 7 and urged against a rollway formed by the lateral surface 200 of the slideway 6 of the column 4. This assembly is viewed on Figs. 1 and 2 on a small scale and represented in detail on a larger scale on Figs. from 3 to 7 inclusive.

Figs. 3 and 4 show again the compensating roller 13 which is urged against the rollway surface 200 of the slideway 6 of the column 4. This compensating roller is carried by a piston 10 housed in a pressure cylinder 20 provided with a cylinder head 12. The piston 10 is constituted by a tubular middle part 14 welded at one end to a part 15 carrying a clevis 16 and, at the other end, to a cover 17. A shaft or stud 18 housed in a bore 19 of clevis 16 runs perpendicular to the axis of piston 14 through the clevis 16. The compensating roller 13 is supported on shaft 18 by means of a double-row self-aligning roller bearing 23. The inner race of this bearing is maintained against movement in the longitudinal direction by means of two spacing rings 24 respectively located between the inner race of the bearing and the two internal faces of the legs of the clevis 16. The outer race of the bearing 23 is maintained within the bore 25 of the roller 13 by means of two retaining rings 26, spacing washers 27 being interposed which serve also as protection washers for the bearing. The shaft 18 is longitudinally maintained within the clevis 16 by means of two retaining rings 28 housed in grooves 29 cut into the bore 19 of the clevis.

The pressure cylinder 20 is fixed to the top of the saddle 7 by means of screws 33, Fig. 3. A pressure oil inlet is provided at 34 in the cylinder head 12. The tightness of the piston within the cylinder is ensured by means of two O-rings 35 and the tightness of the cylinder head 12 on the pressure cylinder 20 is also ensured by an O-ring 36.

Figure 5:
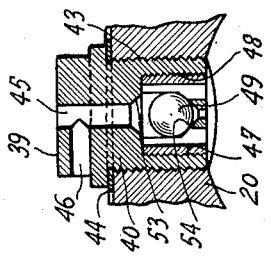
Fig. 5 shows in sectional view along line V—V of Fig. 4 a detail on still a larger scale.
Figure 10:
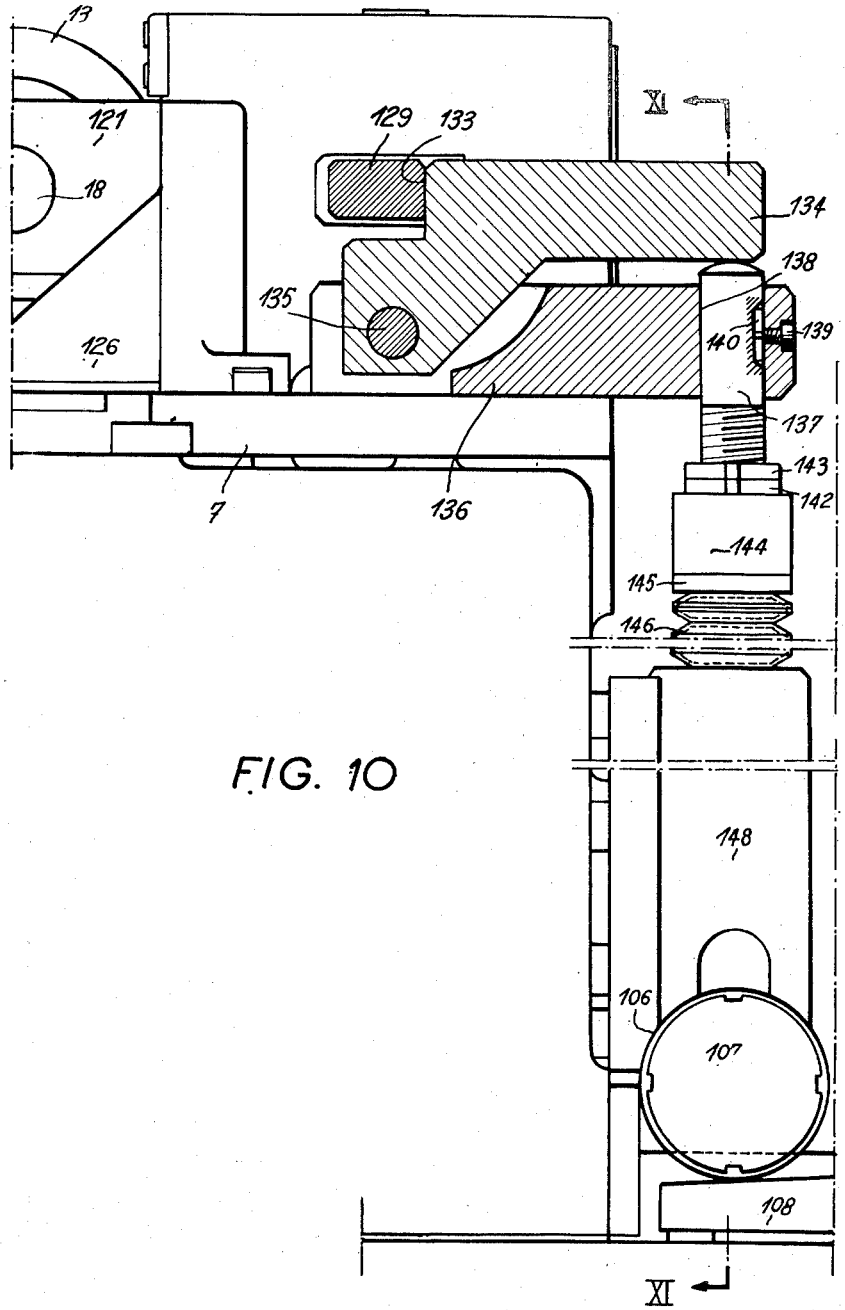
Fig. 10 is a side elevational view, some portions being in section, similar to Fig. 6 and relates also to the second embodiment of the invention.

The top of the cylinder 20 constitutes an oil reservoir 37 closed by a cover 38. The space between the piston cover 17 and the cylinder head 12 is connected to that reservoir by means of a special fitting providing a check valve designed to allow this space to be constantly filled by letting the oil from the reservoir flow down into this space but preventing it to flow up in the opposite direction of the oil flow. As shown in Fig. 5, this fitting is constituted by an externally threaded body 40 screwed into a tapped hole 43 in the upper part of the cylinder 20 with a sealing washer 44 positioned between a flange on body 40 and a surface on the cylinder 20. The top of the body 40 is externally shaped as a hexagon to allow screwing it and is provided with an axial hole 45 and a radial hole 46 opening into the axial hole.

The lower part of the body 40 comprises a threaded bore 47 in which is screwed a small chapel shaped part 48 containing a ball 49. The ball may bear either on the conical seat 53 of the body, or else on the conical seat 54 of the chapel.

The longitudinal motion of the piston 10 within the cylinder 20 is limited towards the left by a flange 55 fixed to the corresponding end of the cylinder 20 by means of screws 56, when the device is not mounted on the machine.

The pressure oil introduced through the oil inlet 34 in the cylinder head head 12 is supplied through pipe 69 from the control cylinder 57 the location of which is represented on the Figs. 1 and 2 and the description of which follows now with more particular reference to Figs. 6 and 7. The control cylinder 57 is also secured to the saddle 7 by means of a lug or bracket 58 welded to the cylinder body 57 and attached by screws 59 and positioned by centering pins 60. The cylinder 57 is arranged in such a way that its axis is vertical and its upper end is closed by a cover 63 fastened to the cylinder 57 by means of screws 64. The cover 63 is provided in its center with a tapped hole 65 in which a pressure gauge 66 (see also Figs. 1 and 2) is screwed. A radial hole 67 drilled in this cover communicates with the central hole 65 and its outer part is internally threaded in order to receive a fitting 68 intended to fasten the pipe 69 supplying the oil under pressure to the pressure cylinder 20.

Inside the pressure cylinder 57 a slidable control piston 73 is urged downwards by a compression spring 74 the two ends of which bear respectively against the cover 63 and the upper end of piston 73. The piston 73 is retained, when assembling or dismounting, by the end of a screw 75 passing through the cylinder wall, the end of the screw 75 engaging a longitudinal groove 76 cut into the piston.

The tightness of the cover 63 and the piston 73 within the cylinder 57 is ensured by means of O-rings 77 and 78 respectively.

The lower part of piston 73 is formed into an extension or threaded rod 79 on which is mounted a special nut 83 provided with a spherical bearing surface 84 cooperating with a complementary spherical bearing surface 85 provided on a cup shaped part 86 against the lower face of which bears the upper end of a compression spring 87 the lower end of which bears upon a plunger 88. A lock-nut 89 allows clamping of the nut 83 to the threaded rod 79.

The plunger 88 is slidably fitted in a cylindrical vertical guiding sleeve 92 supported by plate 93 welded thereon, this plate being fastened to the lateral wall of the saddle 7 (see also Figs. 1 and 2) by means of screws 94 (see also Fig. 7). The plunger 88 is retained by the end of a screw 95 (Fig. 6) which runs through the wall of the guiding sleeve 92, this end engaging a longitudinal groove 96 (Fig. 7) cut into the plunger.

The lower end of the plunger 88 is provided with a horizontal hole 97 in which is housed a stud 98 held in position in the plunger by means of a taper pin 99 (see also Fig. 8).

This stud 98 serves as a support for the double-row self-aligning ball bearing 103 the inner race of which is maintained against a shoulder of the stud 98 by means of a retaining ring 104 housed in a groove 105 cut into the end of the stud 98.

The outer race of the bearing 103 supports a control roller 106 and is maintained in position by means of a cover 107 threaded in the roller 106 which at the same time prevents the ingress of any foreign matter into the bearing.

Beneath the control roller 106 is arranged a cam 108 having a sloping control rollway surface and secured to the top of the spindle-carriage 8 by means of screws 109, spacing washers 113 being positioned between cam 108 and the carriage 8 in order to facilitate the assembly. The location and the dimensions of the cam 108 are such that when the spindle-carriage 8 is shifted towards the left (on the drawing) the slanting surface of the cam comes into contact with the control roller 106.

The operation of the device just described is as follows:

The device is assume to be filled with oil, which means that the control cylinder 57, the pressure cylinder 20 and the connecting pipe 69 and the reservoir 37 are filled up. The ball 49 rests upon its lower seat 54 and the reservoir communicates with the pressure cylinder. These conditions correspond to the position of the parts as represented on the different figures of the drawing, that is to say, when the spindle-carriage is in the position as represented on Fig. 1. When the spindle-carriage is shifted towards the left-hand side, the cam 108 which is mounted thereon first comes into contact with the control roller 106 and raises it progressively, this roller moving the plunger 88 upwardly. This plunger compresses thus the spring 87 by a corresponding amount. The cylinder 57 being in communication with the pressure cylinder 20, the oil of this pressure cylinder 20 is then subjected to an increasing pressure which may be read on the pressure gauge 66. As soon as the pressure begins to increase, the ball 49 is urged against its upper seat 53, thus cutting off the communication between the reservoir 37 and the pressure cylinder 20. The oil in the reservoir still remains at the atmospheric pressure. The pressure of the oil in the cylinder is transmitted to the piston 10 which urges with a corresponding force the compensating roller 13 against the vertical slideway 200 of the column 4. The force exerted on the roller 13 is greater than that applied to the roller 106 because of the larger area of the piston 10 relative to the area of the piston 73.

Consequently the more the spindle-carriage 8 is shifted towards the left on its saddle 7 (see Fig. 1), the more it overhangs and the more the slanting rollway raises the control roller 106. Accordingly, the more the oil pressure increases the higher the pressure of the compensating roller 13 against the vertical rollway surface 200 adjacent slideway 6 of the column.

The result is that the tipping stress originated by the overhang of the spindle-carriage, i. e. the stress exerted between the vertical slideway of the saddle 7 and the vertical slideway 5 of the column, is compensated by the pressure with which the compensating roller 13 carried by the saddle is urged against the rollway 200 of the column.

This device may be easily adjusted by tightening more or less the nut 83 on the threaded rod 79 in order to increase or lessen the initial stress of the compression spring 87. It is equally possible to adjust the intensity of the compensating stress according to the position of the spindle-carriage on the saddle by modifying the thickness of the spacing washers 113 placed between the cam 108 and the spindle-carriage 8.

Furthermore it is possible to replace the cam or rollway 108 by another one of a different profile or outline so that the intensity of the compensating stress be varied according to any selected law, for instance if a supplementary attachment or a tooling device were bolted to the face 114 of the spindle-carriage 8 (see Fig. 1).

It is to be noted that the stress exerted by the control roller 106 upon the cam 108 tends furthermore to even up the pressure on the various points of the horizontal slideways of the spindle-carriage 8 in contact with the horizontal slideways of the saddle. Thus, this fact has to be taken into consideration as to the dimensions of the different parts composing the device described above in order to determine the appropriate reaction of the saddle 7 upon the spindle-carriage 8.

The device described is hydraulically controlled. As a modification thereof, a similar device mechanically driven will now be described, with more particular reference to the Figs. from 9 to 11 inclusive.

In these figures is shown again the vertical slideway 6 of the column 4 against the side rollway 200 of which bears the compensating roller 13 mounted in a clevis 121 according to an arrangement similar to the embodiment previously described. The clevis 121 is carried by a piston constituted by a tubular part 122, a cylindrical part 123 integral with the clevis 121, and an annular part 124, these different parts being welded together. The cylindrical part 123 and the annular part 124 are slidably arranged in bores 125 of a cylinder 126 fixed to the upper face of the saddle 7 by means of screws 127. The cylindrical part 123 which supports the clevis comprises on its right-hand part a projecting portion 128 against which bears a lever 129 pivotally mounted by one of its ends on a vertical shaft 130 carried by the cylinder 126, the other end of this lever being in contact with a shoulder 133 provided on a second lever 134 pivotally mounted adjacent one of its ends on a horizontal shaft 135 mounted in a support 136 also fixed to the top of the saddle 7 by means of screws 141. The other end of this lever 134 bears upon the upper end of a vertical rod 137 slidably arranged in a bore 138 in the support 136. In the course of assembly or dismounting, the rod 137 is retained by a screw 139 screwed into the support 136 and the end of which engages a longitudinal groove 140 cut into the rod 137.

Figure 11:
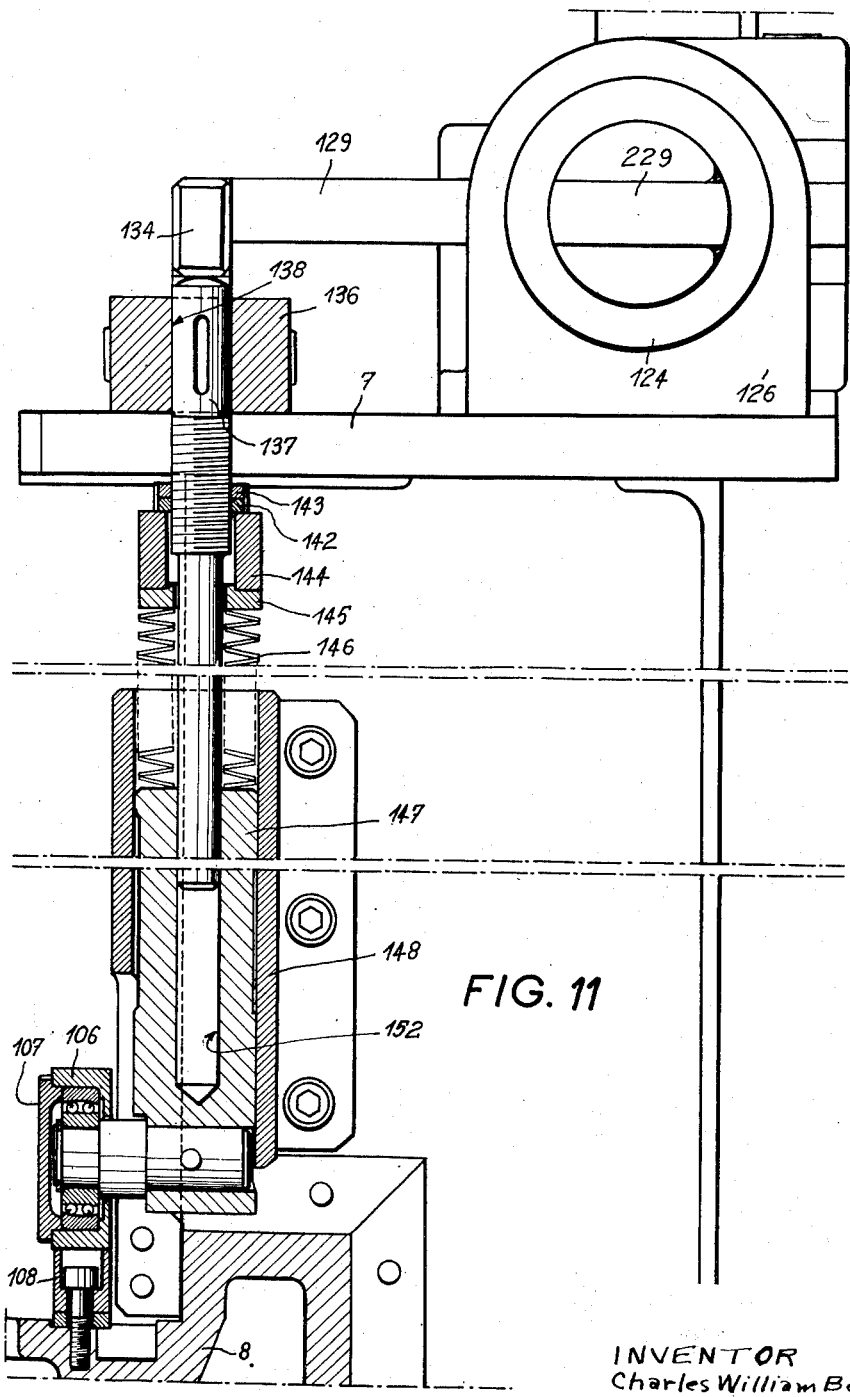
Fig. 11 is a sectional view along line XI—XI of Fig. 10.

The middle portion of the rod 137 is threaded and carries an adjusting nut 142 associated with a lock-nut 143. Against the lower face of the nut 142 bears a spacing ring 144 which in turn bears on a washer 145 engaging a set of spring-washers 146 which bear on a plunger 147 (see Fig. 11) similar to the plunger 88 of the embodiment previously described. This plunger 147 is slidably fitted in a cylindrical guiding sleeve 148 and supports at its lower part the control roller 106 disposed so as to roll along a slanting rollway surface of cam 108 identical with the one of the previous embodiment. The lower part of the rod 137 is guided within a bore 152 of the plunger 147. The force applied at the roller 106 is multiplied at the roller 13 in the ratio provided by the compound levers 134, 129.

The operation of the device described with reference to the Figs. from 9 to 11 inclusive is similar to the one of the previous embodiment. During the horizontal displacements of the spindle-carriage 8 on its saddle 7, the control roller 106 is subjected to corresponding vertical displacements and compresses more or less the set of spring-washers 146, thus exerting through the plunger 147, the spring-washers 146, the rod 137, the levers 129 and 134 and the clevis 121, an appropriate stress upon the compensating roller 13 in contact with the vertical slideway 6 of the column.

The adjustment may be effected by means of the nut 142 and it is equally possible to design the cam 108 according to any required profile or outline.

Of course, the invention is not confined to the embodiments described and represented which have been given only by way of examples.

What I claim is:

1. In a machine the combination with an upright member providing thereon a vertical slideway, a saddle supported on said upright member for movement of said saddle upwardly and downwardly along said slideway, said saddle providing thereon a horizontal slideway surface, and a machine part supported on said saddle for movement of said part forwardly and reversely along said horizontal slideway surface to different positions of said machine part in cantilever relation to said saddle, of a rollway supported on said upright member and extending vertically parallel to said slideway of said upright member, a roller supported on said saddle for rotation thereof on its axis in rolling engagement with said rollway concomitantly with movement of said saddle along said vertical slideway, means operatively connected to said roller and to said saddle and operable to urge said roller to move relative to said saddle and against said rollway to move said saddle transversely of said vertical rollway, and means operatively connecting said machine part to said roller urging means and operable in response to movement of said machine part along said horizontal slideway of said saddle to different cantilever positions of said part relative to said saddle to vary the pressure of said roller against said rollway to compensate for vertical displacement of said machine part relative to said saddle transversely of said horizontal slideway surface of said saddle in said different cantilever positions of said machine part.

2. In a machine the combination as defined in claim 1 in which said means operatively connecting said machine part to said roller urging means comprises resilient means adapted to determine the pressure of said roller against said rollway.

3. In a machine the combination as defined in claim 2 in which said resilient means comprises a spring element, and means engaging said spring element and operable to adjust the setting thereof to vary the pressure of said roller against said rollway determined by said resilient means.

4. In a machine the combination as defined in claim 1 in which said means operable in response to movement of said machine part to different cantilever positions thereof comprises means carried by said machine part and providing a camming surface extending in the same general direction as and in inclined relation to said horizontal slideway surface of said saddle, and a follower carried by said saddle and operatively connected to said roller urging means and engageable with said camming surface to effect movement of said follower and operation of said roller urging means to vary the pressure of said roller against said vertical rollway, said camming surface being disposed relative to said horizontal slideway of said saddle so that said follower is moved successively to different positions in which said pressure of said roller on said rollway is successively greater and less according as the horizontal displacement of said machine part in said different cantilever positions thereof relative to said saddle is successively greater and less.

5. In a machine the combination as defined in claim 1 in which said roller urging means comprises a force amplifying mechanism for increasing the pressure of said roller on said rollway relative to the force developed upon operation of said means operable in response to movement of said machine part relative to said saddle.

6. In a machine the combination as defined in claim 1 in which said roller urging means comprises a main cylinder supported by said saddle, a main piston slidable to and fro in said main cylinder and operatively connected to said roller for urging said roller against said rollway upon movement of said piston in a given direction in said cylinder and reducing the pressure of said roller against said rollway upon reverse movement of said piston, said means operatively connecting said machine part to said roller urging means comprising a control cylinder supported by said saddle, a control piston slidable to and fro in said control cylinder and operatively connected to said machine part for movement of said control piston in response to said movement of said machine part to different cantilever positions relative to said saddle, a pipe connecting said main cylinder and said control cylinder, and a fluid pressure medium within said cylinders and said pipe for transmitting movement of said control piston to said main piston to operate said roller urging means to move said roller toward and away from said rollway in response to movement of said machine part to different positions of greater and less cantilever relation to said saddle.

7. In a machine the combination as defined in claim 6 in which the cross-sectional area of said main cylinder is larger than the cross-sectional area of said control cylinder to multiply the force applied to said roller with respect to the force applied to said control piston upon movement of said machine part relative to said saddle.

8. In a machine the combination as defined in claim 1 in which said roller urging means comprises a mechanical mechanism for multiplying at said roller the force developed by operation of said means operable in response to movement of said machine part relative to said saddle.

9. In a machine the combination with a supporting member providing a slideway surface thereon, and a part supported by said supporting member and slidable on said slideway surface to different positions therealong, said slideway surface being subjected to variable stress exerted thereon by said slidable part in the different positions of said slidable part relative to said supporting member, of a device for compensating for play between said slidable part and said slideway surface of said supporting member which comprises a control rollway disposed with its length extending generally parallel to the length of said slideway surface and supported by said slidable part, a control roller supported on said supporting member for rotation thereof on its axis in rolling engagement with said control rollway concomitantly with said sliding movement of said slidable part on said slideway of said supporting member, means operatively connecting said supporting member to said slidable part and operable to effect movement of one with respect to the other generally transversely of the surface of said slideway to compensate for play between said slideway surface and said slidable part, and means operatively connecting said control roller to said operable means for operating said operable means to effect said transverse movement upon said rolling movement of said control roller in engagement with and along said control rollway concomitantly with movement of said slidable part on said slideway of said supporting member.

References Cited in the file of this patent
UNITED STATES PATENTS 2,464,415    Philippe  ---------------- Mar. 15, 1949
2,665,613    Horlacher  ------------- Jan. 12, 1954